United States Patent [19]

Riordan

[11] 4,094,237
[45] June 13, 1978

[54] APPARATUS FOR THE TREATMENT OF BRINE

[76] Inventor: Patrick Brian Riordan, 92 Roselawn, Castleknock, Dublin, Ireland

[21] Appl. No.: 640,144

[22] Filed: Dec. 12, 1975

[30] Foreign Application Priority Data

Dec. 12, 1974 Ireland .................................. 2564/74
Feb. 25, 1975 Ireland .................................. 390/75

[51] Int. Cl.² .............................................. A23L 3/28
[52] U.S. Cl. ........................................ 99/451; 99/535; 426/248; 426/652; 21/54 R; 21/102 R; 21/DIG. 2; 210/167
[58] Field of Search ............... 426/248, 652; 21/54 R, 21/102 R, DIG. 2; 99/451, 532, 535, 196; 210/73 R, 82, 252, 295, 86, 124, 167

[56] References Cited

U.S. PATENT DOCUMENTS

| 2,065,962 | 12/1936 | Bowers .................................. 210/86 |
| 3,016,004 | 1/1962 | Harper, Jr. et al. ............... 99/532 X |
| 3,386,369 | 6/1968 | Vogt ....................................... 99/532 |
| 3,642,134 | 2/1972 | Reckers .............................. 210/82 X |
| 3,679,053 | 7/1972 | Koulovatos et al. .................. 210/86 |
| 3,791,790 | 2/1974 | Wyndham et al. ............. 21/DIG. 2 |
| 3,825,494 | 7/1974 | Call et al. ....................... 21/102 R X |

OTHER PUBLICATIONS

Bergmeyer, *Methods of Enzymatic Analysis*, Academic Press, New York, (1965), p. 19.
Skoog et al., *Analytical Chemistry*, Holt, Reinhart and Winston, New York, (1965), pp. 451–454.

*Primary Examiner*—Raymond N. Jones
*Assistant Examiner*—Esther M. Kepplinger
*Attorney, Agent, or Firm*—Young & Thompson

[57] ABSTRACT

The invention relates to a method and apparatus for purifying bacterially-contaminated brine overflow from a bacon curing machine. The contaminated brine is collected in a collecting tank, passed through a filter and mixed with fresh brine which is directed on to the back of the filter to back-wash the filter. The mixture of brines is passed through a series of ultra-violet liquid purifying devices and then through a second filter.

5 Claims, 4 Drawing Figures

APPARATUS FOR THE TREATMENT OF BRINE

The invention relates to a method and apparatus for the treatment of brine used in the curing of bacon.

One of the most satisfactory methods of curing bacon and in particular whole sides of bacon, commonly known as "Wiltshire" sides, is by means of an automatic multineedle injection machine. With this machine the bacon side is fed on a conveyor beneath a plurality of injection needles through which brine is pumped. Movement of the side past the needles is intermittent and at each pause the needles descend to puncture the side and so inject brine into the meat. There is a large overflow of brine from the needles and to allow this overflow to run to waste would be most uneconomical. It has been the practice, therefore, to collect the overflow in a tank and recycle it to the needles. However, it has been found that the overflow becomes highly contaminated with bacteria due to the fact that it flows over the bacon side, and so bacon treated with the contaminated brine may not meet the necessary hygiene requirements and may be of a poor keeping quality.

It is an object of the invention to overcome this problem and to provide a method and apparatus for purifying the overflow brine before recycling it to the needles.

Accordingly, the invention provides a method of continuously treating contaminated brine from a bacon curing machine which comprises the steps of collecting and filtering the contaminated brine, subjecting the filtered brine to ultra-violet irradiation, mixing the filtered brine with fresh substantially uncontaminated brine before it is subjected to said ultraviolet irradiation, and feeding the mixture to the curing machine. Preferably, the brine is filtered a second time after the ultra-violet irradiation. During the first filtration step the filter is continually back-washed by means of the fresh substantially uncontaminated brine.

Apparatus for carrying out the method of the invention comprises a collecting tank for contaminated brine, a first filter adapted to receive contaminated brine from the tank and having a filtrate outlet in fluid connection with the inlet of at least one ultra-voilet liquid purifying device, a second filter in fluid connection with the outlet of said device, supply means for mixing the filtrate from either of said first or second filters with substantially uncontaminated fresh brine, and means such as a pump or the like for passing the brine through the filters and the ultra-violet liquid purifying device. Preferably, the apparatus includes three ultra-violet liquid purifying devices arranged in series, and the supply means for the fresh brine is connected to the first filter whereby the fresh brine may be directed on to the back of the first filter to back-wash the first filter and prevent it from clogging.

The invention is further described with reference to the accompanying drawings, wherein.

Figure 1:
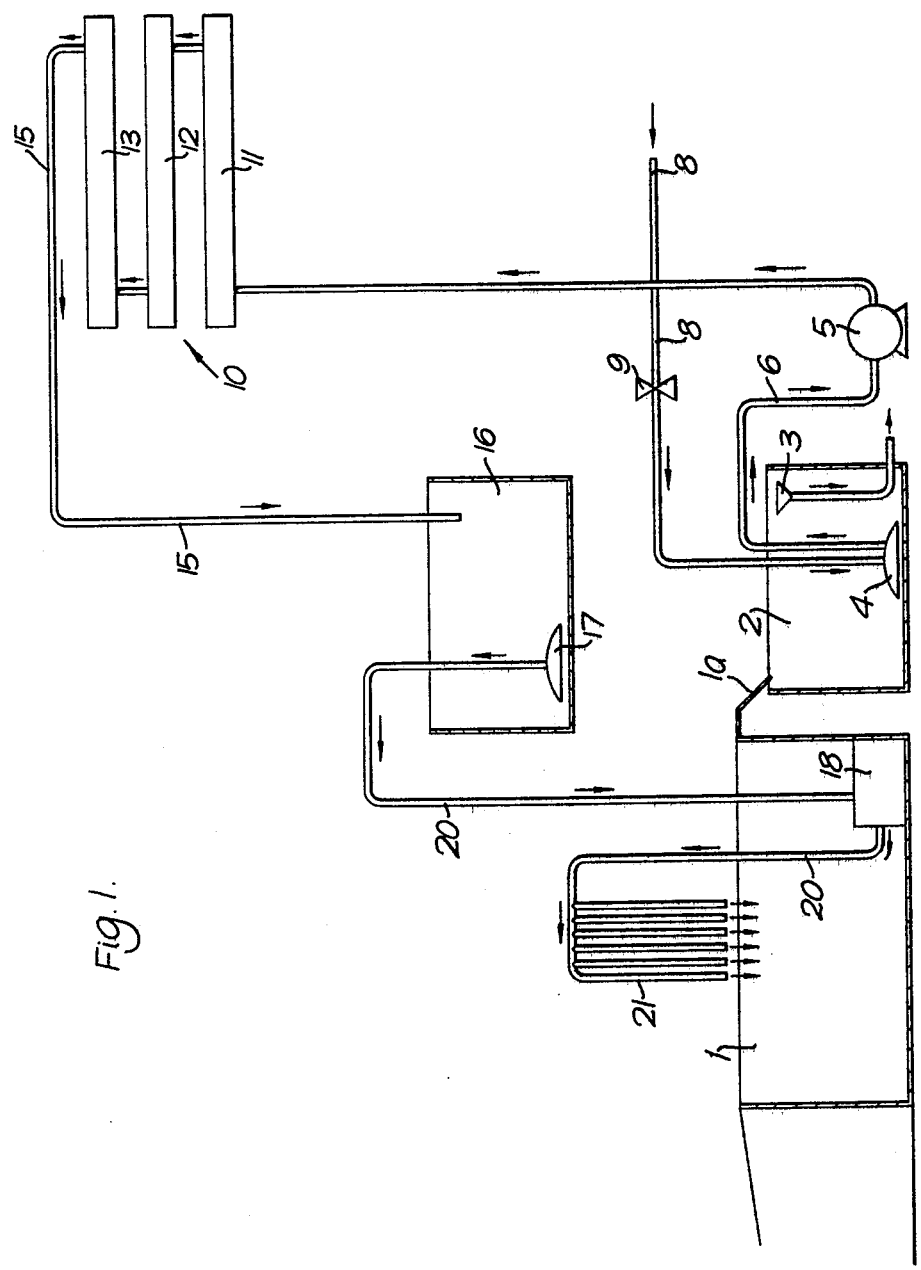
FIG. 1 is a flow diagram of one embodiment of the invention.
Figure 2:
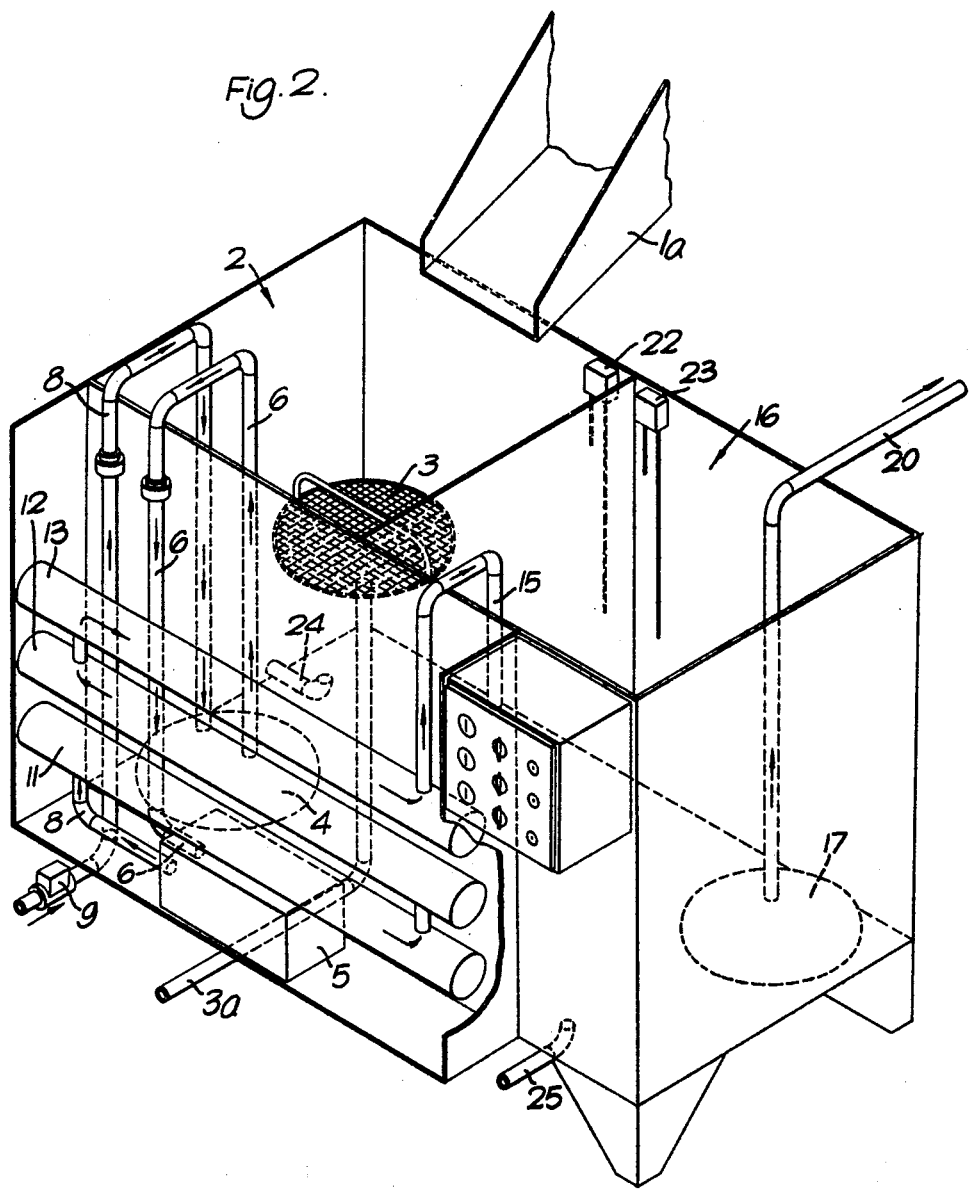
FIG. 2 is a perspective view of the apparatus illustrated in FIG. 1.
Figure 3:
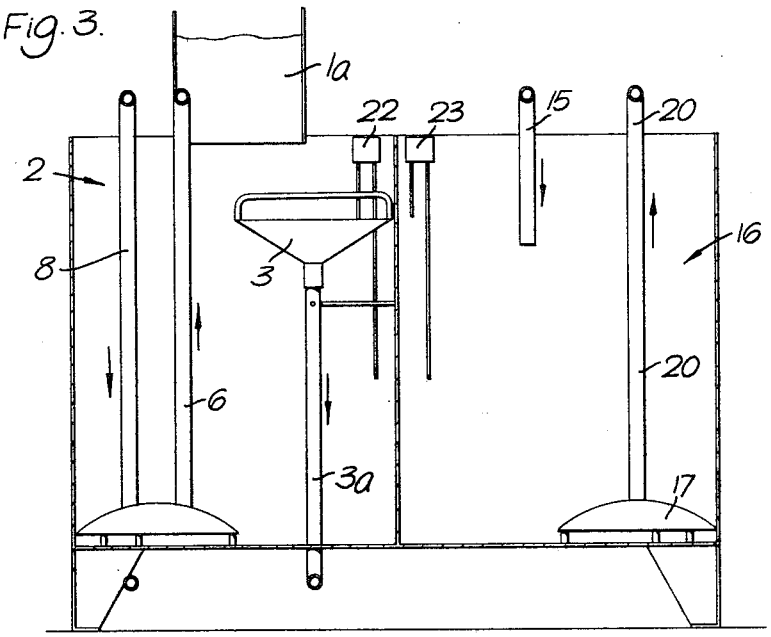
FIG. 3 is a front sectional elevation of the line X — X of FIG. 4.
Figure 4:
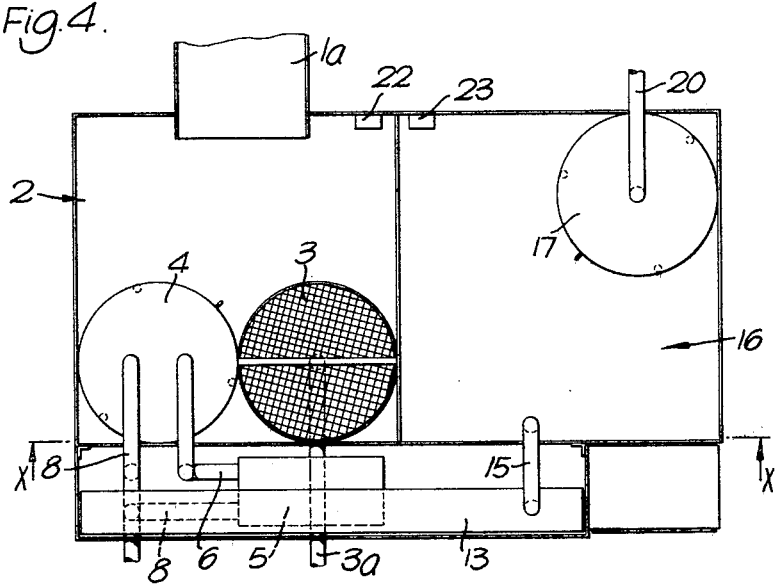
FIG. 4 is a plan view of the apparatus of FIG. 1.

Referring now to the drawings, contaminated brine overflow from a multineedle injection bacon curing machine 1 is directed by a chute 1a into a collecting tank 2, which may have a capacity of, for example, 45 gallons. The spillage from the curing machine may be of the order of 330 gals/hour, and the tank 2 is provided with a brine skimmer 3, which is adjustable in height, and which collects pieces of fat etc. from the surface of the brine, and allows them to flow to waste through pipe 3a. A dome-shaped first micron filter head 4 is located within the tank 2. Contaminated brine is drawn through the filter by means of a ⅜ h.p. pump 5 and is pumped through a pipe 6 to ultra-violet purifying means 10, at a rate of approximately 300 gals/hour. A pipe 8 fitted with a solenoid valve 9 leads from the fresh brine supply and is directed on to the back of the filter 4 so that it back-washes the filter and prevents it from clogging. The mixture of fresh and filtered return brine is then passed to ultra-violet purifying means 10. This mixture is found to have a higher ultra-violet transmission value, thus giving a better bacteriological kill than contaminated brine alone. Preferably, the ultra-violet light transmission value of the brine mixture should not drop below 10% when measured in 1 cm quartz cell using an SP 8000 spectrophotometer.

The ultra-violet purifying means 10 comprises three ultra-violet liquid purifiers (for example of the kind sold under the trade name "Ultradynamics" - Model 500, which has a capacity of 400 gals/hour). The pipe 6 is connected to the inlet of a first purifier 11 which is connected in series with two further purifiers 12 and 13. The outlet of purifier 13 is connected by means of a pipe 15, to a second tank 16.

A second dome-shaped micron filter 17 is located within the tank 16 and the brine in the tank is drawn through the filter by means of the piston-actuated suction pump 18 of the curing machine. The filtrate is pumped through pipe 20 to the injection needles 21 of the curing machine.

Operation of the solenoid valve 9 is controlled by the float switches 22 and 23 located in tanks 2 and 16, respectively. These switches ensure that there is a continuous controlled flow of brine through the apparatus, and if the brine rises to such a height in either of the tanks that there is a danger of overflow then the switches act to close the valve 9 and cut-off the pump. The tanks 2 and 16 and the ultra-violet purifying means 10 are all housed together in one unit, the front portion of which is enclosed in a removable cover. The tanks 2 and 16 are provided with drain pipes 24 and 25. The ultra-violet purifying means 10 is preferably provided with a visual indicator to show that each lamp is operating, and also with a monitor to indicate the level of ultra-violet transmission combined with a device which will operate, when the transmission level drops below a pre-determined level, to cut-off the ultra-violet units, the pump 5, and also the multineedle injection machine 1. The pump 5 should have a capacity of at least 600 gals/hour, and preferably has positive suction so as to be self-priming.

It will be noted that the method of the invention is a continuous process as distinct from a batch process and so the apparatus of the invention lends itself for incorporation in standard multineedle injection machines. It is found that a substantial reduction in bacterial numbers is achieved on spillage return brine during Wiltshire bacon production using the method and apparatus of the invention. This is exemplified by the following Table which sets out the results of microbiological counts carried out on samples taken at various times during the process. The counts obtained on return brine samples treated in accordance with the invention are similar to counts obtained from freshly made up pumping brines.

| BACTERIOLOGICAL COUNTS ON 4% SALT AGAR | | |
|---|---|---|
| Time | Before U.V. Treatment | After U.V. Treatment |
| 8.00 am | 970 | 8 |
| 8.30 | 57,700 | 87 |
| 9.00 | 15,900 | 110 |
| 9.30 | 1,220 | 4 |
| 10.00 | 10,600 | 30 |
| 10.30 | 18,200 | 40 |
| 11.00 | 110,100 | 204 |
| 11.30 | 7,600 | 460 |
| 12.00 | 26,000 | 20 |
| 12.30 | 32,900 | 400 |
| 2.30 | 7,800 | 4 |
| 3.00 | 2,400 | 21 |
| 3.30 | 28,400 | 62 |

I claim:

1. In combination with a bacon curing machine, apparatus for treating contaminated brine from said bacon curing machine comprising a collecting tank for the contaminated brine, means for directing contaminated brine from said machine to said tank, a filter located in said collecting tank and adapted to receive said contaminated brine and having a filtrate outlet in fluid connection with the inlet of at least one ultra-violet liquid irradiating device, supply means for mixing substantially contaminated fresh brine with the contaminated brine in the collecting tank whereby the ultra-violet transmission value of the contaminated brine is increased, said supply means directing a stream of said substantially uncontaminated fresh brine onto the back of said filter so as to back-wash the filter, means for passing the mixture of brines through the ultra-violet liquid purifying device, and means for thereafter returning the irradiated brine to said bacon curing machine.

2. Apparatus as claimed in claim 1, and a second filter located in a second tank, said second filter being in fluid connection with the outlet of said ultra-violet liquid irradiating device.

3. Apparatus as claimed in claim 1, there being three ultra-violet liquid purifying devices arranged in series.

4. Apparatus as claimed in claim 1, said collecting tank having a surface skimming device which is adjustable in height.

5. Apparatus as claimed in claim 2, said supply means for fresh brine having a solenoid valve, and said tanks each having float switches which are adapted to control the solenoid valve and the means for passing the brine through the filters and the ultra-violet liquid irradiating device.

* * * * *